(12) United States Patent
Chou (10) Patent No.: US 8,498,612 B2
(45) Date of Patent: Jul. 30, 2013

(54) OPERATION SUPPORT SYSTEM FOR WIRELESS NETWORKS

(75) Inventor: Joey Chou, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 1023 days.

(21) Appl. No.: 11/698,323

(22) Filed: Jan. 26, 2007

(65) Prior Publication Data

US 2008/0183604 A1    Jul. 31, 2008

(51) Int. Cl.
*H04W 88/02* (2009.01)

(52) U.S. Cl.
USPC .......................................................... 455/406

(58) Field of Classification Search
USPC ......................................... 370/328; 455/406
See application file for complete search history.

(56) References Cited

U.S. PATENT DOCUMENTS

| | | | | |
|---|---|---|---|---|
| 6,853,630 B1 * | 2/2005 | Manning | ....................... | 370/338 |
| 2001/0029174 A1 * | 10/2001 | Herajarvi et al. | ............. | 455/406 |
| 2002/0173907 A1 * | 11/2002 | Ando | ............................ | 701/209 |
| 2004/0106393 A1 * | 6/2004 | Chowdhury et al. | ......... | 455/406 |
| 2004/0193513 A1 * | 9/2004 | Pruss et al. | ..................... | 705/30 |

OTHER PUBLICATIONS

Chou, "WiMAX OSS Frameworks", Draft Version 1.0, WiMAX Forum, Jan. 22, 2007, 18 pages.

* cited by examiner

*Primary Examiner* — Diane Mizrahi
(74) *Attorney, Agent, or Firm* — Cool Patent, P.C.

(57) ABSTRACT

Briefly, in accordance with one or more embodiments, an accounting management architecture for an operational support system for a wireless network comprises an accounting client capable of retrieving the accounting information from a base station and forwarding the accounting information to an accounting server of a connectivity service network (CSN) which may be the home CSN of the mobile station or a visited connectivity service network when the mobile station is roaming. If the mobile station is roaming, the visited CSN may function as a proxy/server between the visited accounting client and the home accounting server. An element management system may retrieve the accounting records and forward the accounting records to a billing processing system.

27 Claims, 6 Drawing Sheets

OPERATION SUPPORT SYSTEM FOR WIRELESS NETWORKS

BACKGROUND

Higher performance networks are being proposed to provide broadband access to larger area networks such as the Internet. One such proposed network is being promulgated by the Worldwide Interoperability for Microwave Access (WiMAX) Forum to provide a broadband networks in compliance with an Institute of Electrical and Electronics Engineers (IEEE) 802.16 type standard and/or a European Telecommunications Standards Institute (ETSI) High Performance Radio Metropolitan Area Network (HiperMAN) type standard. Mobile WiMAX is on track to the rapid deployment of tens to hundreds of millions of subscribers over the next several years. In order to achieve such a deployment, service providers will implement management systems to enable the automation of WiMAX network operations and business processes that are handled by an operation support system (OSS) and/or a business support system (BSS). The operation support system may be utilized to support network operations such as fault management, performance management, and/or security management, or the like. The business support system may be utilized to support business development operations including configuration management and/or account management, or the like. In general, an operation support system may refer to all or most operation support system and/or business support system types of network management functionalities.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

Some portions of the detailed description that follows are presented in terms of processes, programs and/or symbolic representations of operations on data bits and/or binary digital signals within a computer memory, for example. These process descriptions and/or representations may include techniques used in the data processing arts to convey the arrangement of a computer system and/or other information handling system to operate according to such programs, processes, and/or symbolic representations of operations.

A process may be generally considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It may be convenient at times, principally for reasons of common usage, to refer to these signals as bits, values, elements, symbols, characters, terms, numbers and/or the like. However, these and/or similar terms may be associated with the appropriate physical quantities, and are merely convenient labels applied to these quantities.

Unless specifically stated otherwise, as apparent from the following discussions, throughout the specification discussion utilizing terms such as processing, computing, calculating, determining, and/or the like, refer to the action and/or processes of a computing platform such as computer and/or computing system, and/or similar electronic computing device, that manipulate and/or transform data represented as physical, such as electronic, quantities within the registers and/or memories of the computer and/or computing system and/or similar electronic and/or computing device into other data similarly represented as physical quantities within the memories, registers and/or other such information storage, transmission and/or display devices of the computing system and/or other information handling system.

Embodiments claimed may include one or more apparatuses for performing the operations herein. Such an apparatus may be specially constructed for the desired purposes, or it may comprise a general purpose computing device selectively activated and/or reconfigured by a program stored in the device. Such a program may be stored on a storage medium, such as, but not limited to, any type of disk including floppy disks, optical disks, CD-ROMs, DVDs, magnetic-optical disks, read-only memories (ROMs), random access memories (RAMs), electrically programmable read-only memories (EPROMs), electrically erasable and/or programmable read only memories (EEPROMs), flash memory, magnetic and/or optical cards, and/or any other type of media suitable for storing electronic instructions, and/or capable of being coupled to a system bus for a computing device, computing platform, and/or other information handling system.

The processes and/or displays presented herein are not inherently related to any particular computing device and/or other apparatus. Various general purpose systems may be used with programs in accordance with the teachings herein, or a more specialized apparatus may be constructed to perform the desired method. The desired structure for a variety of these systems will appear from the description below. In addition, embodiments are not described with reference to any particular programming language. It will be appreciated that a variety of programming languages may be used to implement the teachings described herein.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

In one or more embodiments, a database may refer an organization of information created, stored, accessed, edited, and/or otherwise utilized by a computing platform. In one or more embodiments, a tag may refer to a command contained in a file, object, and/or document that may specify how the file, object, and/or document, and/or a portion thereof, may be formatted. In one or more embodiments, metadata may refer to information pertaining to data contained in a file, object, and/or document, for example formatting information, date of creation, date of editing, date saved, how data was obtained, and/or from where data was obtained. Such metadata, for example, may be utilized in for database management purposes and/or for data warehousing of multiple databases, although the scope of claimed subject matter is not limited in this respect. In one or more embodiments, an application programming interface (API) may refer to a set of routines, protocols, and/or tools utilized to cause a program to operate in conjunction with an operating system. In one or more embodiments, an operating system may refer to a program to execute on a computing platform to handle input and/or output commands, file management, printing, displaying, storing, and/or communicating of information for the computing platform. However, these are merely examples of database and/or operating system functions, and the scope of claimed subject matter is not limited in these respects.

Figure 1:
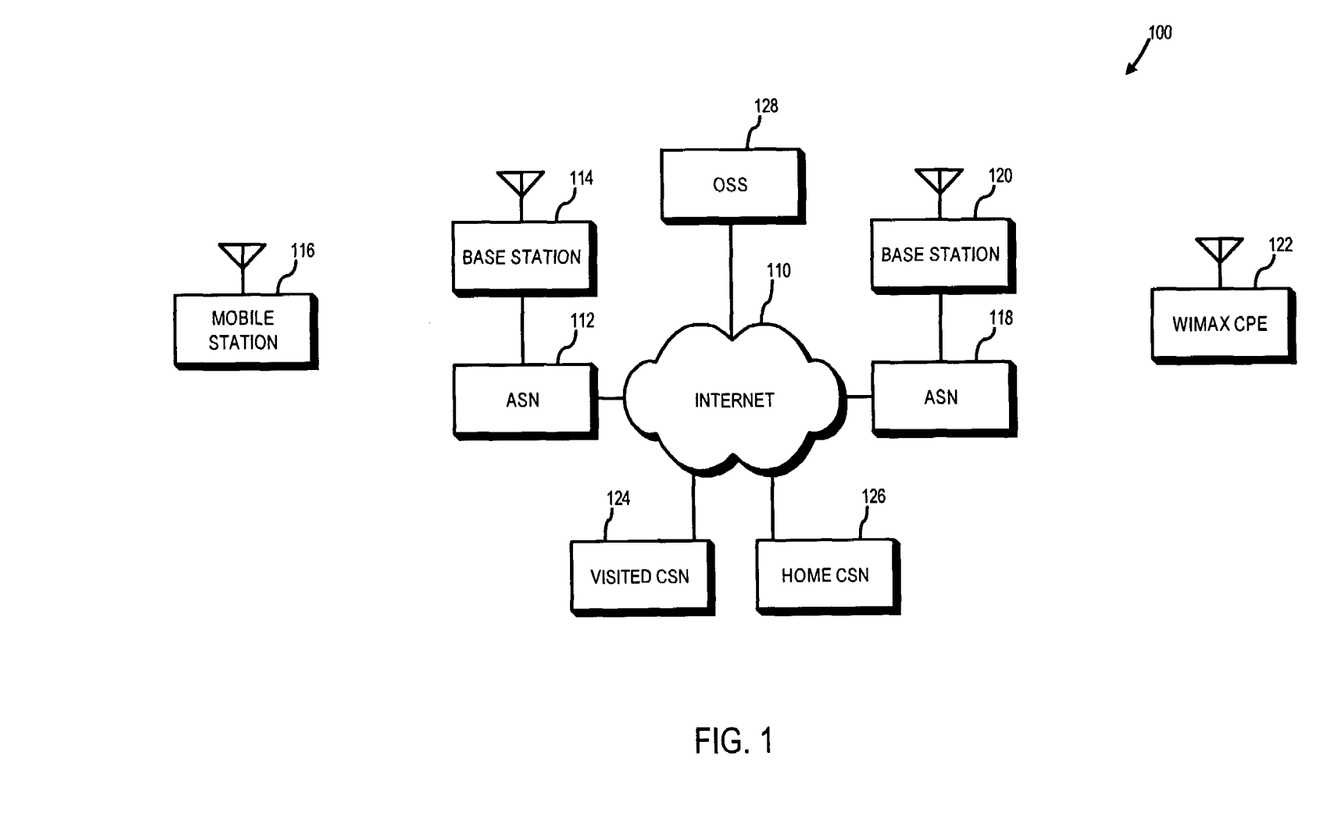
FIG. 1 is a diagram of a network reference model of a fixed broadband and/or mobile wireless type network such as a WiMAX type network in accordance with one or more embodiments.

Referring now to FIG. 1, a diagram of a network reference model of a fixed broadband and/or mobile wireless type network such as a WiMAX type network in accordance with one or more embodiments will be discussed. As shown in FIG. 1, network 100 may be an Internet Protocol (IP) type network comprising an Internet 110 type network or the like that is capable of supporting mobile wireless access and/or fixed broadband wireless access to Internet 110. As an example of mobile wireless access, access service network (ASN) 112 is capable of coupling with base station 114 to provide wireless communication between mobile station 116 and Internet 110. Mobile station 116 may comprise a mobile type device or information handling system capable of wirelessly communicating via network 100, for example a notebook type computer, a cellular telephone, a personal digital assistant, or the like. ASN 112 may implement profiles that are capable of defining the mapping of network functions to one or more physical entities on network 100. Base station 114 may comprise radio equipment to provide radio-frequency (RF) communication with mobile station 116, and may comprise, for example, the physical layer (PHY) and media access control (MAC) layer equipment in compliance with an IEEE 802.16 type standard. Base station 114 may further comprise an IP backplane to couple to Internet 110 via ASN 112, although the scope of the claimed subject matter is not limited in these respects.

Network 100 may further comprise a visited connectivity service network (CSN) 124 capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or Voice over Internet protocol (VOIP) gateways, and/or Internet Protocol (IP) type server functions, or the like. However, these are merely example of the types of functions that are capable of being provided by visited CSN or home CSN 126, and the scope of the claimed subject matter is not limited in these respects. Visited CSN 124 may be referred to as a visited CSN 124 in the case for example where visited CSN 124 is not part of the regular service provider of mobile station 116, for example, where mobile station 116 is roaming away from its home CSN, such as home CSN 126, or, for example, where network 100 is part of the regular service provider of mobile station, but where network 100 may be in another location or state that is not the main or home location of mobile station 116. In a fixed wireless arrangement, WiMAX type customer premises equipment (CPE) 122 may be located in a home or business to provide a home or business customer broadband access to Internet 110 via base station 120, ASN 118, and home CSN 126 in a manner similar to access by mobile station 116 via base station 114, ASN 112, and visited CSN 124, a difference being that WiMAX CPE 122 is generally disposed in a stationary location, although it may be moved to different locations as needed, whereas mobile station may be utilized at one or more locations if mobile station 116 is within range of base station 114 for example.

In accordance with one or more embodiments, operation support system (OSS) may be part of network 100 to provide management functions for network 100 and to provide interfaces between functional entities of network 100. Embodiments relating to how OSS 128 may provide such management functions and interfaces for network 100 are discussed in further detail with respect to FIG. 2.

Figure 2:
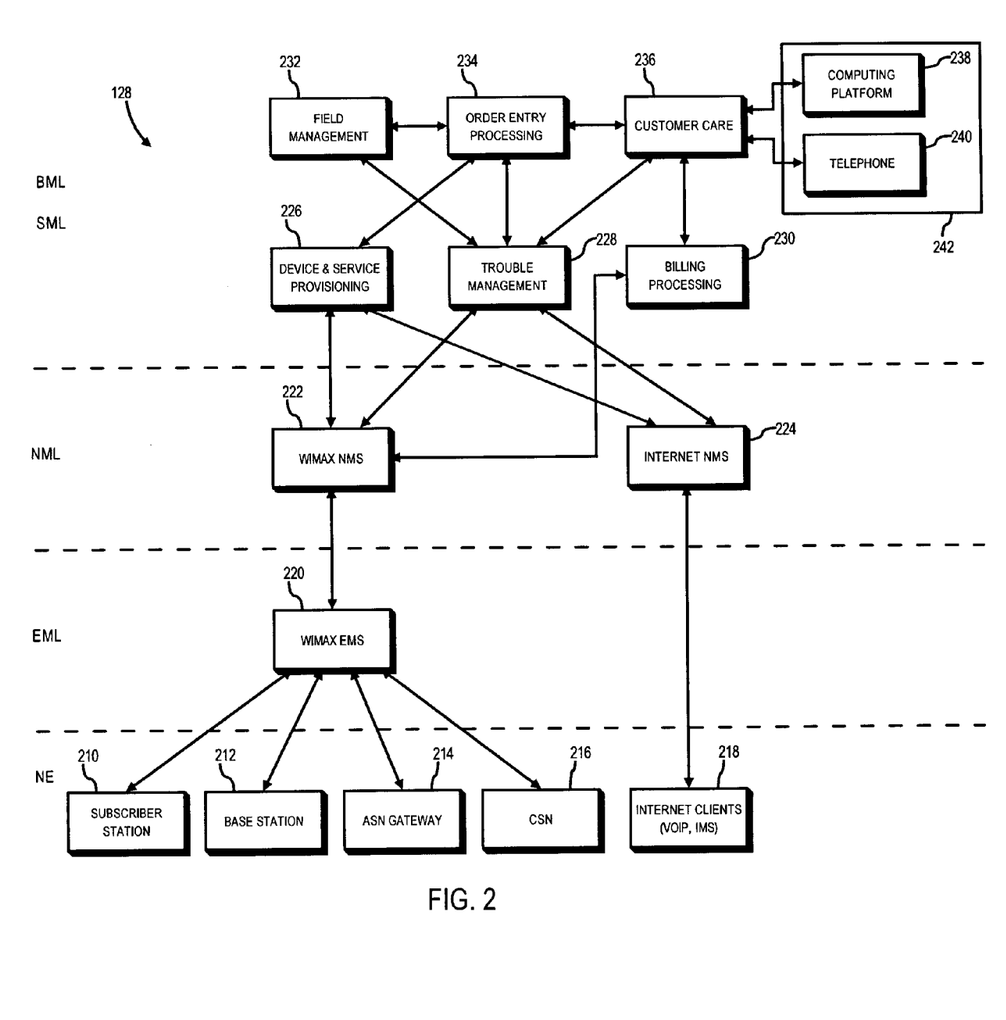
FIG. 2 is a diagram of functional entities of an operation support system for a WiMAX type network or the like depicting interaction of the network elements in accordance with one or more embodiments.

Referring now to FIG. 2, a diagram of functional entities of an operation support system for a WiMAX type network or the like depicting interaction of the network elements in accordance with one or more embodiments will be discussed. In one or more embodiments, operation support system 128 defines the interfaces between management entities and network elements of network 100, and to assist the seamless integration of technologies that may be developed in order to meet the requirements of OSS 128. In one or more embodiments, OSS 128 management functions may be divided into one or more of the following layers and/or elements as shown in FIG. 2: Network Elements (NE) comprising communication equipment that is addressable and manageable; Element Management Layer (EML) that contains functions to manage network elements directly and which may include alarm management, handling of information, backup, logging, and/or maintenance of equipment hardware and software; Network Management Layer (NML) that focuses on managing the functions related to the interaction between multiple network elements, and which performs functions for distribution of network resources such as configuration, control and/or supervision of network 100; Service Management Layer (SML) that manages aspects of network 100 that may directly be observed by the users, and which performs functions for the management of services in the network definition, administration and/or billing of services; Business Management Layer (BML) that manages the whole enterprise, for example goal setting or strategically planning, and which performs functions related to business aspects, analyzes trends and quality issues, for example, or to provide a basis for billing and/or other financial reports.

In one or more embodiments, network management functions implemented by OSS 128 may be based at least in on a Fault Management, Configuration Management, Accounting Management, Performance Management, and Security Management (FCAPS) type model for example as introduced in International Telecommunication Union (ITU) ITU-T recommendation M-3400. In such embodiments, the network management functions implemented by OSS 128 may comprise one or more of the following: Fault Management which involves detection and/or mitigation of problems causing faults; Configuration Management which involves the setting and changing of network attributes for proper network operations; Account Management which tracks the usages of resources and services by customers; Performance Management which includes the monitoring of traffic and network performance to insure a subscriber's Service Level Agreement (SLA) is enforced; Security Management which involves network security and user or device authentication and authorization.

In accordance with one or more embodiments, network elements may comprise equipment on and/or communicating with network 100. As shown in FIG. 2, such network elements may comprise, for example, one or more subscriber stations 210 which may be, for example, mobile station 116 or CPE 122. Management of subscriber stations 210 may be in compliance with an Institute of Electrical and Electronics Engineers (IEEE) 802.161 Management Information Base (MIB) type standard. If one or more of subscriber stations 210 do not support IEEE 802.16i MIB, then a proxy in base station 114 or 120 may manage such subscriber stations 210 via whatever protocol the subscriber stations 210 support on behalf of network management system 222. Another network element may be one or more base stations 212 which may comprise, for example, base station 114 or base station 120. In one or more embodiments, IEEE 802.163 MIB is used to manage base stations 210. ASN Gateway 214 may contain remote authentication dial-in user services (RADIUS) type clients that should be managed by RADIUS client MIBs which in one or more embodiments may be enhanced to support WiMAX type features. Such RADIUS type clients of ASN Gateway 214 may comprise for example, Internet Engineering Task Force (IETF) IETF RFC4668 "RADIUS Authentication Client MIB for IPv6", IETF RFC4670 "RADIUS Accounting Client MIB for IPv6", IETF RFC4672 "RADIUS Dynamic Authorization Client MIB", and/or any other MIB type module capable of supporting configuration, fault and/or performance management features. Another network element may comprise CSN 216 which may comprise, for example, visited CSN 124 or home CSN 126. CSN 216 may contain RADIUS type servers capable of being managed by RADIUS server MIBs that may be enhanced to support WiMAX type features. Such RADIUS type servers of CSN 216 may comprises, for example, IETF RFC 4669 "RADIUS Authentication Server MIB for IPv6", IETF RFC4671 "RADIUS Accounting Server MIB for IPv6", IETF RFC4673 "RADIUS Dynamic Authorization Server MIB", and/or any MIB module capable of supporting configuration, fault and/ or performance management features. In addition, another network element may comprise one or more internet clients 218 that are capable of managing internet applications such as Internet Multi-media Subsystems (IMS), and/or Voice over Internet Protocol (VOIP), running on mobile station 116 and/ or CPE 122, for example. These are merely examples of various types of network elements, and the scope of the claimed subject matter is not limited in these respects.

Turning now to the Element Management Layer (EML) as shown in FIG. 2, element management system (EMS) 220 may comprise management stations for managing the management agents residing at the network elements (NE) 210 through 218. In one or more embodiments, such management stations may comprise one or more of the following: Fault management, which provides alarm reporting, cancellation, correlation, and/or filtering, and which further provides fault identification, mitigation, and recovery, including rerouting traffic through other network elements, and/or initiating diagnostics remotely to avoid truck rolls; Configuration management, which provides device provisioning and/or service provisioning; Accounting management, which tracks service usage data on per subscriber basis; Performance management, which monitors statistics of received signal strength indication (RSSI)/carrier to interface-plus-noise ratio (CINR) on the air interface, traffic load, and/or resource utilization, and which uses performance data to determine if system upgrade or maintenance is required before the failures occur; Security management, which defines the policies for user and/or service authorization on per subscriber basis.

Turning now to the Network Management Layer (NML) as shown in FIG. 2, network management system (NMS) 22 may comprise interfaces to one or more EMSs 220 to perform management functions. Internet NMS 224 may be responsible for managing Internet clients according to the needs of the particular application. NMS 222 and/or Internet NMS 224 may comprise one or more of the following management functions: Fault management, which manages and provide repair or temporarily workaround for faults automatically detected by network elements, or manually reported by subscribers, and which includes redundancy management, protection schemes, routine maintenance, trouble tickets and/or trouble tracking; Configuration management, which provides network resource configuration and provisioning; Performance management, which gathers the performance data that may be utilized to ensure that the quality of service (QoS) as defined in the subscriber's service level agreements are being met, or to plan network evolution; Account management, which monitors network resource usage; Security management, which provides various levels of control to network resources.

Turning now to the Service Management Layer (SML) and the Business Management Layer (BML) of FIG. 2, an example implementation of a typical service management system (SMS) and a business management system (BMS) will be discussed. However, these are merely example implementations that may vary depending on the structure of various service providers of network 100, and the scope of the claimed subject matter is not limited in these respects. The Service Management Layer (SML) and the Business Management Layer (BML) may comprise one or more of the following systems: Customer Care 236 typically deals with taking new orders and/or trouble tickets, and/or responding to billing questions. Customer care 236 may be the first line interface to customers to insure higher levels of customer service; Device and Service Provisioning 226 may comprise device provisioning which includes the configurations of subscriber stations 210, base stations 212, and/or other networks elements for bringing up the system, and service provisioning which may be responsible for bringing up a new subscriber service; 242 may comprise computing platform interface 238 or telephone interface 240 and may be the entry point for customer input via phone based or web-based interfaces to enable a customer to order new services, access billing information, and/or report trouble tickets; Billing Processing 230 may be responsible for processing and/or creating invoices for subscribers. Billing processing may interface with roaming partners to calculate roaming charges, and may also includes payment processing, prepayment processing, debit card processing, credit card processing, electronic banking payment processing, automatic check withdraw processing, invoice adjustment processing, service termination processing, and/or service resume processing; Trouble Management 228 may be responsible for customer-reported trouble tickets and/or issues associated with quality of service (QoS) agreements, and may also include trouble report generation and an interface to Customer Care 236. Trouble Management 228 may also generate work orders for field management; Order Entry Processing 234 may take orders from Customer Care 236, and any interface Device and Service Provisioning 226 to provision service for a new customer. Order Entry Processing 234 may also communicate with Field Management 232 for dispatching a truck roll if needed; Field Management 232 may coordinate consolidation of multiple orders to effectively and/or efficiently schedule truck rolls for repairs and/or new service installations. Field Management 232 type functions may be performed manually or automatically. If automated systems are being used for Field Management 232, such systems may take into account the type of repair and/or installation being scheduled so that the appropriate type and/or level of technician may be dispatched. Field Management 232 may also recognize when multiple orders for a single location are being processed to ensure that a combination of the orders may be processed via a single truck roll rather than multiple truck rolls.

Figure 3:
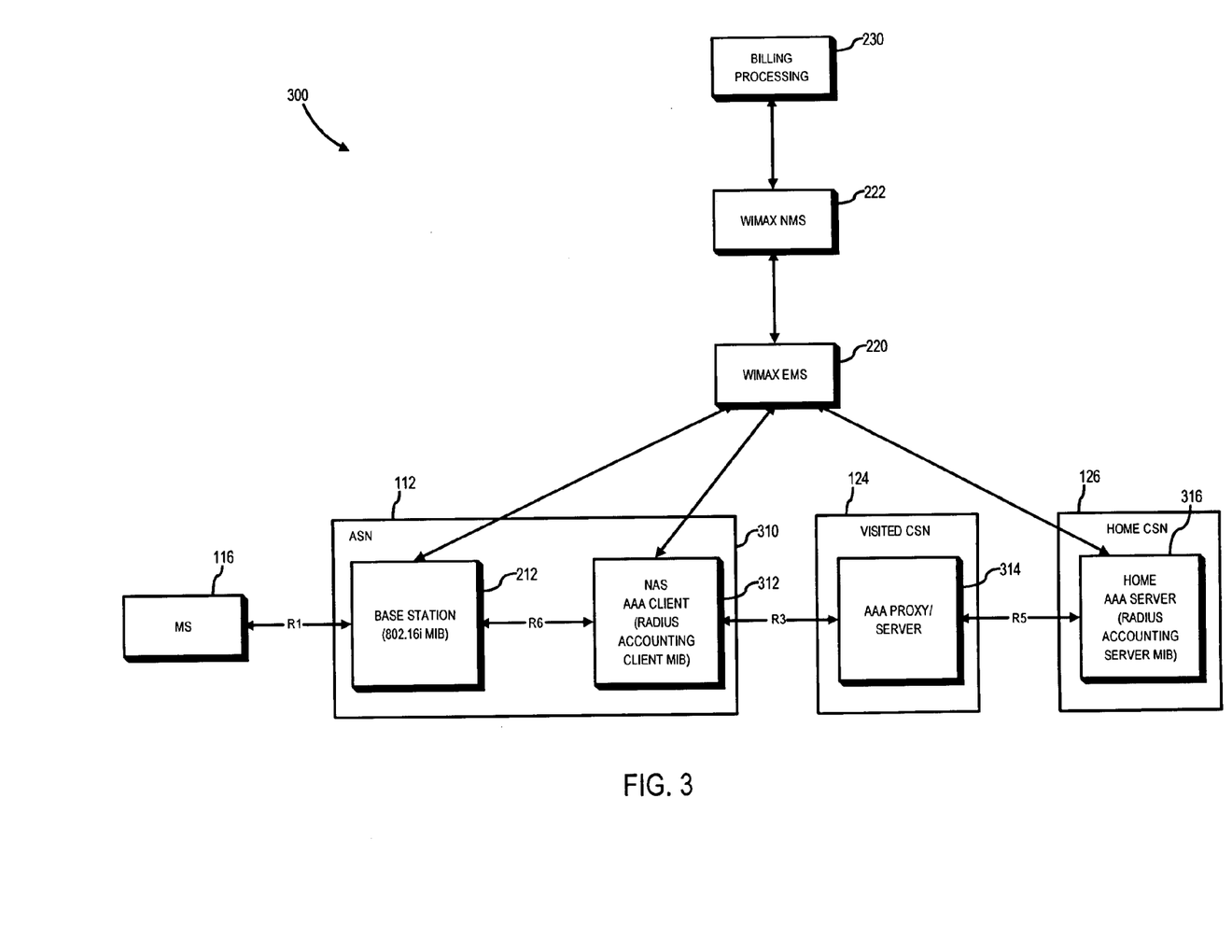
FIG. 3 is a diagram of an accounting management architecture for a WiMAX type network depicting interaction between operation support system management functions and the network elements in accordance with one or more embodiments.

Referring now to FIG. 3, a diagram of an accounting management architecture for a WiMAX type network depicting interaction between operation support system management functions and the network elements in accordance with one or more embodiments will be discussed. FIG. 3 shows an Accounting Management Architecture 300 to describe how accounting records are collected and reported to Home CSN 126 as mobile station 116 roams from base station 120 to base station 114, for example, or to different network 100 of a different network service provider. In one or more embodiments, Accounting Management Architecture 300 as shown in FIG. 3 may be utilized to support accounting requirements as defined in various WiMAX type specifications, although the scope of the claimed subject matter is not limited in this respect.

In one or more embodiments, Accounting Management Architecture 300 may comprise one or more of the following: Base Station 212 comprising 802.16i MIB, which is capable of capturing both usage and/or time based accounting records on a per service flow basis; AAA Client 312 in Network Access Server (NAS) 310, which is capable of interfacing with 802.16i MIB in multiple base stations 212 to retrieve accounting records that are to be stored in a RADIUS type Accounting Client MIB. AAA client 312 may correlate accounting records from multiple SFs in order to generate IP connection based accounting records; AAA Proxy/Server 314 in Visited CSN 124, which may forward the accounting request to a remote RADIUS server, or receive the reply from the remote server, and send that reply to AAA Client 312 if mobile station 116 roams into network 100 which is located outside Home CSN 126 of mobile station 116; AAA Server 316 in Home CSN 126, wherein a RADIUS type Accounting Server MIB in home AAA Server 316 is capable of storing accounting records for one or more subscriber; WiMAX EMS 220, which provides an interface to 802.16i MIB, RADIUS type servers and/or client MIBs to retrieve accounting records that via NMS 222 and billing processing 230. One or more scenarios illustrating the procedures of accounting management as implemented via accounting management architecture are shown in and described with respect to FIG. 4 and FIG. 5.

Figure 4:
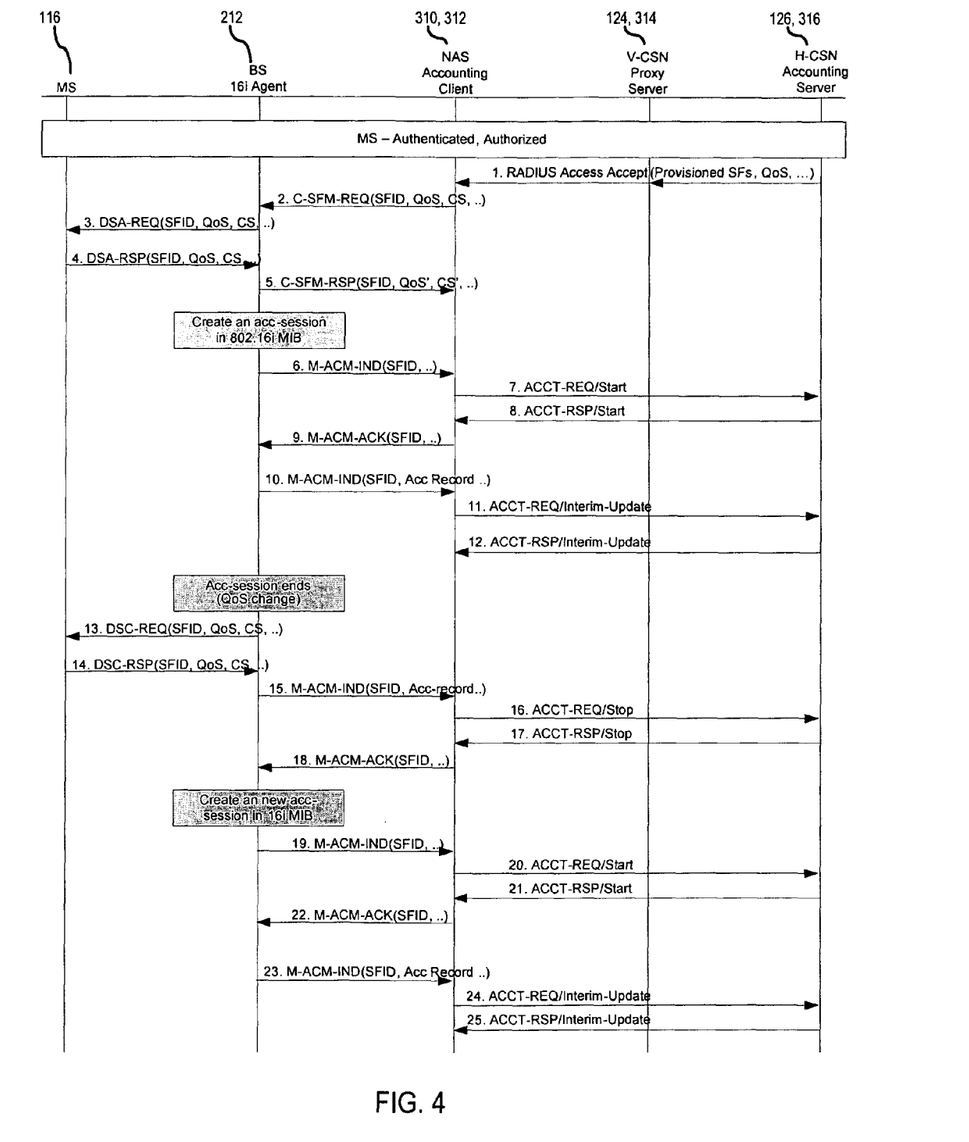
FIG. 4 is a flow diagram of accounting management control capable of implementing a change in a quality of service in accordance with one or more embodiments.

Referring now to FIG. 4, a flow diagram of accounting management control capable of implementing a change in a quality of service in accordance with one or more embodiments will be discussed. Although the flow diagram of FIG. 4 shows one particular example order of operations, various other orders may be provided, with a more or fewer operations than shown in FIG. 4, and the scope of the claimed subject matter is not limited in these respects. As shown in FIG. 4, if a quality of service (QoS) is changed, the control flow of an accounting session may be as follows:

1. After mobile station 116 has been authenticated and authorized, Home CSN 126 sends a RADIUS Access Accept message with provisioned SF's attributes, and QoS/CS parameters to accounting client in the ASN 112, via Proxy Server 314 of Visited CSN 124.

2. NAS 310 calls 16g primitive C-SFM-REQ to ask base station 212 to create the provisioned service flows.

3. Base station 212 sends a DSA message to create a service flow with the provisioned QoS Parameter set. Base station 212 determines the admitted QoS Parameter set for such service flow by considering the capacity and usage load in Base station 212. In most cases, the admitted QoS Parameter will be the subset of the Provisioned QoS Parameter set.

4. Mobile station 116 returns the DSA-RSP to confirm that the service flow has been created.

5. Base station 212 returns C-SFM-RSP to NAS to indicate that the service flow has been created.

6. Base station 212 creates an accounting session in the 16i MIB for such service flow, and calls M-ACM-IND primitive to indicate to NAS that an accounting session has been created in the 16i MIB. NAS 310 also creates an accounting session in RADIUS accounting client MIB 312.

7. NAS calls ACCT-REQ/Start to start the accounting session in AAA server 316 in Home CSN 126. ACCT-REQ/Start may be forwarded by AAA Proxy/server 314 in Visited CSN 124.

8. AAA server 316 returns ACCT-RSP/Start message.

9. NAS 310 returns M-ACM-ACK to Base Station 114. Operations 3 through 9 may be repeated for multiple provisioned service flows for uplink and downlink.

10. Base station 212 periodically sends M-ACM-IND to update the usage data that will used at NAS 310 for online accounting, for example to check the usage data against the subscription quota.

11. NAS 310 sends ACCT-REQ/Interim Update to AAA server 316.

12. AAA server 316 returns AAA-RSP/Interim update

13. The accounting session is ended, since the QoS for a service flow has been changed. Base station 212 sends DSC-REQ to change the QoS.

14. Mobile station 116 returns DSC-RSP. Base station 212 closes the old accounting session in 802.16i MIB.

15. Base station 212 calls M-ACM-IND primitive to inform NAS 310 that an accounting session is ended. NAS 310 also closes the accounting session in RADIUS accounting client MIB 312.

16. NAS 310 calls ACCT-REQ/Stop to stop the accounting session in AAA server 316 in Home CSN 126. ACCT-REQ/Stop may be forwarded by AAA Proxy/server 314 in Visited CSN 124.

17. AAA server 316 returns ACCT-RSP/Stop message.

18. NAS 310 returns M-ACM-ACK to Base station 212.

19. Base station 212 creates a new accounting session in 802.16i MIB for the same service flow with updated QoS. Base station 212 calls M-ACM-IND primitive to inform NAS 310 that an new accounting session has been created in the 16i MIB.

20. NAS 310 calls ACCT-REQ/Start to start a new accounting session in AAA server 316 in Home CSN 126. ACCT-REQ/Start may be forwarded by AAA Proxy/server 314 in Visited CSN 124.

21. AAA server 316 returns ACCT-RSP/Start message.

22 NAS 310 returns M-ACM-ACK to Base station 212.

23. Base station 212 periodically sends M-ACM-IND to update the usage data that will used at NAS 310 for online accounting, for example to check the usage data against the subscription quota.

24. NAS 310 sends ACCT-REQ/Interim Update to AAA server 316.

25. AAA server 316 returns AAA-RSP/Interim update.

Figure 5:
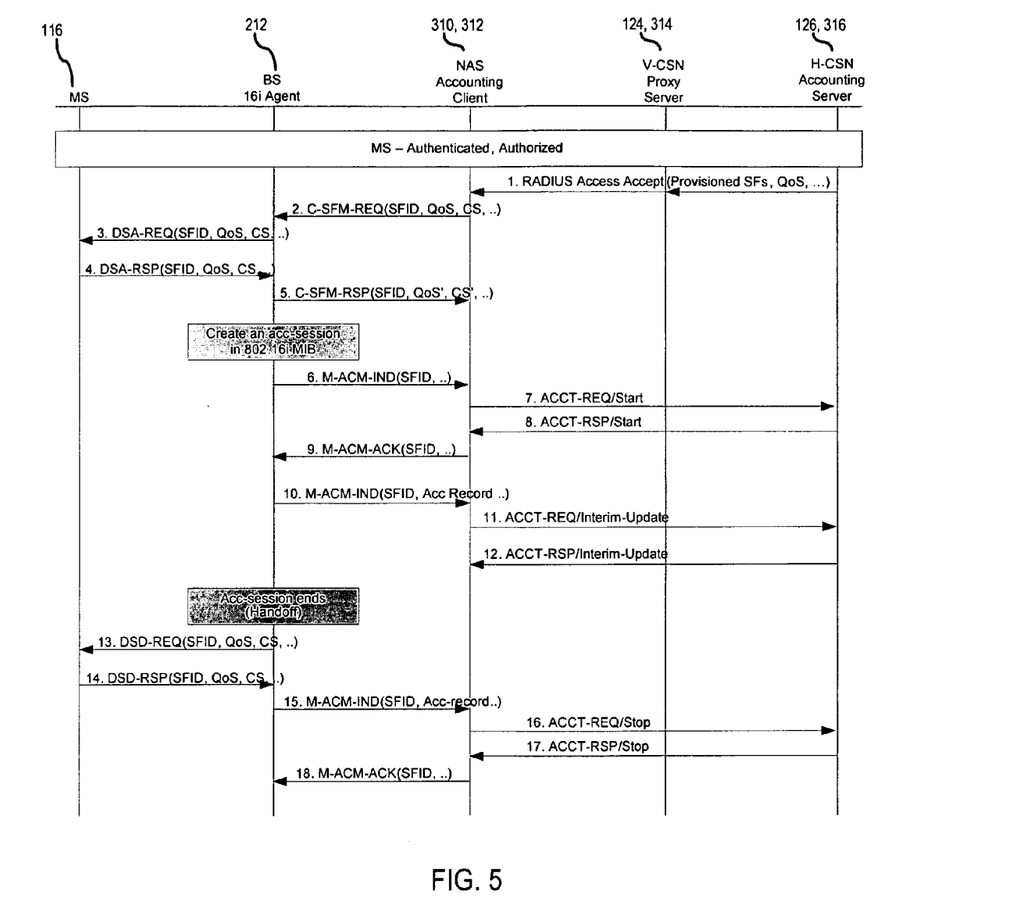
FIG. 5 is a flow diagram of control flow of an accounting session in response to a handoff in accordance with one or more embodiments.

Referring now to FIG. 5, a flow diagram of control flow of an accounting session in response to a handoff in accordance with one or more embodiments will be discussed. Although the flow diagram of FIG. 5 shows one particular example order of operations, various other orders may be provided, with a more or fewer operations than shown in FIG. 5, and the scope of the claimed subject matter is not limited in these respects. As shown in FIG. 5, in response to a handoff the accounting management control flow may be as follows:

1. After mobile station 116 has been authenticated and authorized, Home CSN 126 sends a RADIUS Access Accept message with attributes of a provisioned Service Flow (SF), and QoS/CS parameters to accounting client 312 in ASN 112, via Proxy Server 314 of Visited CSN 124.

2. NAS 310 calls 16g primitive C-SFM-REQ to ask Base station 212 to create the provisioned service flows.

3. Base station 212 sends a DSA message to create a service flow with the provisioned QoS Parameter set. Base station 212 determines the admitted QoS Parameter set for such service flow by considering the capacity and usage load in Base station 212. In most cases, the admitted QoS Parameter will be the subset of the Provisioned QoS Parameter set.

4. Mobile station 116 returns the DSA-RSP to confirm that the service flow has been created.

5. Base station returns C-SFM-RSP to NAS 310 to indicate that the service flow has been created.

6. Base station creates an accounting session in the 16i MIB for such service flow, and calls M-ACM-IND primitive to indicate to NAS 310 that an accounting session has been created in the 16i MIB. NAS 310 also creates an accounting session in the RADIUS accounting client MIB.

7. NAS 310 calls ACCT-REQ/Start to start the accounting session in AAA server 316 in Home CSN 126. ACCT-REQ/Start may be forwarded by AAA Proxy/server 314 in Visited CSN 124.

8. AAA server 316 returns ACCT-RSP/Start message.

9. NAS 310 returns M-ACM-ACK to Base station 212. Operations 3 through 9 may be repeated for multiple provisioned service flows for uplink and downlink.

10. Base station 212 periodically sends M-ACM-IND to update the usage data that will used at NAS 310 for online accounting, for example to check the usage data against the subscription quota.

11. NAS 310 sends ACCT-REQ/Interim Update to AAA server 316.

12. AAA server 316 returns AAA-RSP/Interim update.

13. The accounting session is ended due to handoff. Base station 212 sends DSD-REQ to delete the service flow.

14. Mobile station 116 returns DSD-RSP. Base station 212 closes the old accounting session in 802.16i MIB.

15. Base station 212 calls M-ACM-IND primitive to inform NAS 310 that an accounting session is ended. NAS 310 also closes the accounting session in the RADIUS accounting client MIB.

16. NAS 310 calls ACCT-REQ/Stop to stop the accounting session in AAA server 316 in Home CSN 126. ACCT-REQ/Stop may be forwarded by AAA Proxy/server 314 in Visited CSN 124.

17. AAA server 316 returns ACCT-RSP/Stop message.

18. NAS 310 returns M-ACM-ACK to Base station 212.

Referring now to Table 1, an example of accounting record table in the 802.16i MIB is shown. Entries in Table 1 are addressed by the Acc-session Index that represents an accounting session. The accounting record captures the data usage and time duration on per service flow bases. Service flows may be broken in multiple segments that are not overlapping in time. Accounting sessions are associated with a QoS profile Table as shown in Table 2.

TABLE 1

| | | Accounting Records | | | | | |
|---|---|---|---|---|---|---|---|
| Acc-Session Index | MAC Address | Service Flow ID | QoS Index | Start Time | Stop Time | Data Usage in Octects | Data Usage in MSDU |
| 1 | 125a4fde | 1001001 | 1 | | | | |
| 2 | 125a4fde | 1001002 | 2 | | | | |
| 3 | 125a4fde | 1001001 | 5 | | | | |
| 5 | 125a4fde | 1001005 | 3 | | | | |
| 6 | 125a4fde | 1001006 | 4 | | | | |
| 7 | 101e7f00 | 1101001 | 1 | | | | |
| 8 | 101e7f00 | 1101002 | 2 | | | | |

The accounting records referred to in the headers of Table 1 are as follows: Acc-Session Index: Index to the accounting record table; MAC Address: Uniquely identify a MS; Service flow ID: Uniquely identify a service flow for user traffic. If the service flow ID field is empty, it means this record is for the control channels, for example basic, primary, and secondary CIDs; QoS Index: Point to an entry in the QoS Profile Table that describe the QoS profile for such service flow; Start Time: Time stamp indicating the beginning of an accounting session; Stop Time: Time stamp indicating the ending of an accounting session; Data Usage in Octects: Indicates the data usage in octects that exclude any dropped packets; Data Usage in MSDU: Indicates the data usage in MSDU.

TABLE 2

QoS Profiles Table

| QoS Index | Direction | MaxSustain Rate | MaxTraffic Burst | MinReserved Rate | Tolerated Jitter | MaxLatency | Scheduling Type | CsType |
|---|---|---|---|---|---|---|---|---|
| 1 | Uplink | 128 Kbytes | 2 KByte | 64 Kbyte | 1 ms | 200 ms | rtPS | IPv4 |
| 2 | Downlink | 512 KByte | 2 KByte | 64 Kbyte | 1 ms | 200 ms | rtPS | IPv4 |
| 3 | Uplink | 100 KBytes | 2 KByte | | 1 ms | 50 ms | UGS | IPv4 |
| 4 | Downlink | 100 KBytes | 2 KByte | | 1 ms | 50 ms | UGS | IPv4 |
| 5 | Uplink | 64 Kbytes | 2 KByte | 64 Kbyte | 1 ms | 200 ms | rtPS | IPv4 |

Table 2 shows a QoS Profile table. One or more of the profiles represents an admitted QoS parameter set that may be different from a provisioned QoS parameter set. Admitted QoS parameter sets may indicate actual QoS profiles being provided at the service flow, which is returned to the AAA server to be reflected at billing. RADIUS Accounting Client MIB may be defined in RFC4670 but may be enhanced to support WiMAX type services. RADIUS Accounting Server MIB may be defined in RFC4671, but may be enhanced to support WiMAX type services.

Figure 6:
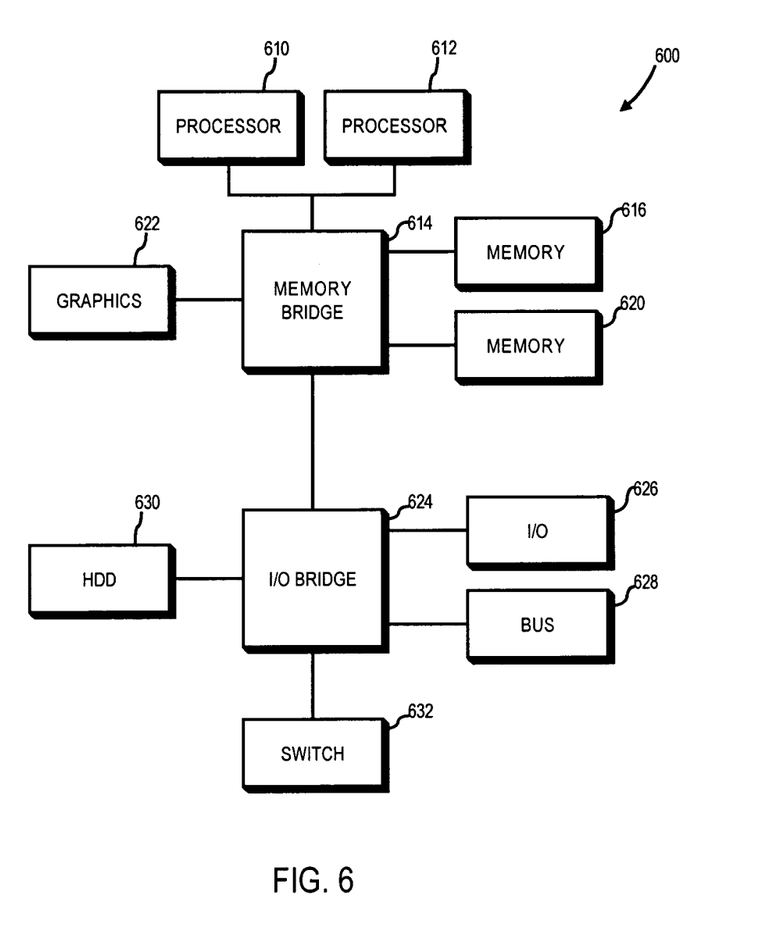
FIG. 6 is a block diagram of an information handling system capable of implementing operation support system for a WiMAX type network or the like in accordance with one or more embodiments.

Referring now to FIG. 6, a block diagram of an information handling system capable of implementing operation support system for a WiMAX type network or the like in accordance with one or more embodiments. Information handling system 600 of FIG. 6 may tangibly embody one or more of any of the items as show in and described with respect to FIG. 1, FIG. 2, and/or FIG. 3. Furthermore, such and information handling system 600 may be arranged to implement the flow diagrams of FIG. 4 and/or FIG. 5, for example as instructions that may be stored on a storage medium and that are capable of being executed by information handling system 600 and/or a similar type of computing platform. Although information handling system 600 represents one example of several types of computing platforms, information handling system 600 may include more or fewer elements and/or different arrangements of elements than shown in FIG. 6, and the scope of the claimed subject matter is not limited in these respects.

Information handling system 600 may comprise one or more processors such as processor 610 and/or processor 612, which may comprise one or more processing cores. One or more of processor 610 and/or processor 612 may couple to one or more memories 616 and/or 618 via memory bridge 614, which may be disposed external to processors 610 and/or 612, or alternatively at least partially disposed within one or more of processors 610 and/or 612. Memory 616 and/or memory 618 may comprise various types of semiconductor based memory, for example volatile type memory and/or non-volatile type memory. Memory bridge 614 may couple to a graphics system 620 to drive a display device (not shown) coupled to information handling system 600.

Information handling system 600 may further comprise input/output (I/O) bridge 622 to couple to various types of I/O systems. I/O system 624 may comprise, for example, a universal serial bus (USB) type system, an IEEE 1394 type system, or the like, to couple one or more peripheral devices to information handling system 600. Bus system 626 may comprise one or more bus systems such as a peripheral component interconnect (PCI) express type bus or the like, to connect one or more peripheral devices to information handling system 600. A hard disk drive (HDD) controller system 628 may couple one or more hard disk drives or the like to information handling system, for example Serial ATA type drives or the like. Switch 630 may be utilized to couple one or more switched devices to I/O bridge 622, for example Gibabit Ethernet type devices or the like.

Although the claimed subject matter has been described with a certain degree of particularity, it should be recognized that elements thereof may be altered by persons skilled in the art without departing from the spirit and/or scope of claimed subject matter. It is believed that the subject matter pertaining to an operation support system for wireless networks and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An operational support system for a wireless network, comprising:

a base station agent located in a base station, the base station agent being capable of capturing accounting information for one or more mobile stations communicating with the wireless network through the base station, the accounting information comprising change of quality of service (QoS) information for the one or more mobile stations communicating with the wireless network through the base station;

an accounting client located at an access service network of the base station, the accounting client being configured to retrieve the accounting information from said base station agent and to forward the accounting information to an accounting server of a connectivity service network, to request from the accounting server update information for the one or more mobile stations communicating with the wireless network through the base station, and to receive from the accounting server the requested update information for the one or more mobile stations, the received update information for checking against subscription quotas for the one or more mobile stations; and an element management system coupled to the connectivity service network, the element management system comprising a fault management station, a configuration management station, an accounting management station, a performance management station, or a security management station, or combinations thereof;

wherein the element management system is capable of retrieving the accounting information from said accounting server or from said base station agent on a per subscriber basis for the one or more mobile stations, said element management system being capable of forwarding the accounting information to a billing processing system.

2. An operational support system as claimed in claim 1, said base station comprising a management information base.

3. An operational support system as claimed in claim 1, said accounting client comprising a network access server.

4. An operational support system as claimed in claim 1, said accounting client comprising a remote authentication dial-in user services type accounting client management information base.

5. An operational support system as claimed in claim 1, said accounting server comprising a remote authentication dial-in user services type accounting server management information base.

6. An operational support system as claimed in claim 1, further comprising a proxy/server capable of forwarding the accounting information to an accounting server.

7. An operational support system as claimed in claim 1, further comprising a proxy/server disposed in a first connectivity service network visited by the one or more mobile stations if the one or more mobile stations are roaming, said proxy/server being capable of forwarding the accounting information to an accounting server disposed in a second connectivity service network of a home network of the one or more mobile stations.

8. An operational support system as claimed in claim 1, further comprising a proxy/server disposed in a first connectivity service network visited by the one or more mobile stations if the one or more mobile stations are roaming, said proxy/server being capable of receiving replies from an accounting server disposed in a second connectivity service network of a home network of the one or more mobile station, and being capable of sending the replies to said accounting client.

9. An operational support system as claimed in claim 1, said accounting client being capable of correlating accounting records from multiple service flows to generate one or more internet protocol connection based accounting records for the one or more mobile stations.

10. A method for managing accounting for a wireless network, comprising:
  retrieving from a base station agent at a base station accounting information for one or more mobile stations communicating with the wireless network through the base station, the accounting information comprising change of quality of service (QoS) information for the one or more mobile stations communicating with the wireless network;
  forwarding the accounting information to an accounting server of a connectivity service network coupled to the wireless network;
  requesting from the accounting server update information for the one or more mobile stations communicating with the wireless network through the base station;
  receiving from the accounting server the requested update information for the one or more mobile stations, the received update information to check against subscription quotas for the one or more mobile stations;
  receiving the accounting information at the connectivity service network for the one or more mobile stations;
  retrieving with an element management system the accounting information received at said connectivity service network from the accounting server, or from the base station agent at the base station, on a per subscriber basis for the one or more mobile stations the element management system comprising a fault management station, a configuration management station, an accounting management station, a performance management station, or a security management station, or combinations thereof; and
  forwarding the accounting information to a billing processing system.

11. A method as claimed in claim 10, said capturing being implemented via a management information base.

12. A method as claimed in claim 10, said forwarding being implemented via a network access server.

13. A method as claimed in claim 10, said forwarding being implemented via a remote authentication dial-in user services type accounting client management information base.

14. A method as claimed in claim 10, said receiving being implemented via a remote authentication dial-in user services type accounting server management information base.

15. A method as claimed in claim 10, further comprising forwarding the accounting information to an accounting server.

16. A method as claimed in claim 10, further comprising forwarding the accounting information to an accounting server disposed in a connectivity service network of a home network of the one or more mobile stations if the one or more mobile stations are roaming.

17. A method as claimed in claim 10, further comprising:
  receiving replies from an accounting server disposed in first connectivity service network of a home network of the one or more mobile stations if the one or more mobile stations are roaming; and
  sending the replies to an accounting client of a second connectivity service network visited by the one or more mobile stations.

18. A method as claimed in claim 10, further comprising correlating accounting records from multiple service flows to generate one or more internet protocol connection based accounting records for the one or more mobile stations.

19. An article of manufacture comprising a non-transient storage medium having instructions stored thereon that, if executed, result in managing accounting for a wireless network, by:
  retrieving from a base station agent at a base station accounting information for one or more mobile stations communicating with the wireless network through the base station, the accounting information comprising change of quality of service (QoS) information for the one or more mobile stations communicating with the wireless network;
  forwarding the accounting information to an accounting server of a connectivity service network coupled to the wireless network;
  requesting from the accounting server update information for the one or more mobile stations communicating with the wireless network through the base station;
  receiving from the accounting server the requested update information for the one or more mobile stations, the received update information to check against subscription quotas for the one or more mobile stations;
  receiving the accounting information at the connectivity service network for the one or more mobile stations;
  retrieving with an element management system the accounting information received at said connectivity service network from the accounting server, or from the base station agent at the base station, on a per subscriber basis for the one or more mobile stations the element management system comprising a fault management station, a configuration management station, an accounting management station, a performance management station, or a security management station, or combinations thereof; and forwarding the accounting information to a billing processing system.

20. An article of manufacture as claimed in claim 19, said capturing being implemented via a management information base.

21. An article of manufacture as claimed in claim 19, said forwarding being implemented via a network access server.

22. An article of manufacture as claimed in claim 19, said forwarding being implemented via a remote authentication dial-in user services type accounting client management information base.

23. An article of manufacture as claimed in claim 19, said receiving being implemented via a remote authentication dial-in user services type accounting server management information base.

24. An article of manufacture as claimed in claim 19, wherein the instructions, if executed, further result in managing accounting for a wireless network by forwarding the accounting information to an accounting server.

25. An article of manufacture as claimed in claim 19, wherein the instructions, if executed, further result in managing accounting for a wireless network, by forwarding the accounting information to an accounting server disposed in a connectivity service network of a home network of the one or more mobile stations if the one or more mobile stations are roaming.

26. An article of manufacture as claimed in claim 19, wherein the instructions, if executed, further result in managing accounting for a wireless network by:
receiving replies from an accounting server disposed in first connectivity service network of a home network of the one or more mobile stations if the one or more mobile stations are roaming; and
sending the replies to an accounting client of a second connectivity service network visited by the one or more mobile stations.

27. An article of manufacture as claimed in claim 19, wherein the instructions, if executed, further result in managing accounting for a wireless network, by correlating accounting records from multiple service flows to generate one or more internet protocol connection based accounting records for the one or more mobile stations.

* * * * *